United States Patent [19]

Ohta et al.

[11] 4,234,607
[45] Nov. 18, 1980

[54] PROCESS FOR PRODUCING CURED MEAT PRODUCTS

[75] Inventors: Shigenori Ohta, Komae; Kenji Watanabe, Hino, both of Japan

[73] Assignee: Kyowa Hakko Kogyo Kabushiki Kaisha, Tokyo, Japan

[21] Appl. No.: 53,161

[22] Filed: Jun. 29, 1979

[30] Foreign Application Priority Data

Jun. 30, 1978 [JP] Japan .................................. 53/78698

[51] Int. Cl.³ .......................... A23B 4/12; A23L 1/272
[52] U.S. Cl. .................................... 426/56; 426/59; 426/266; 426/641; 426/646
[58] Field of Search .................. 426/56, 59, 266, 641, 426/646

[56] References Cited

U.S. PATENT DOCUMENTS

| | | | |
|---|---|---|---|
| 2,739,899 | 3/1956 | Hollenbeck | 426/266 |
| 2,898,212 | 8/1959 | Olson | 426/56 X |
| 3,051,579 | 8/1962 | Hammes | 426/266 |
| 3,255,023 | 6/1966 | Humphreys et al. | 426/266 |
| 3,386,836 | 6/1968 | Borenstein et al. | 426/266 |
| 3,666,488 | 5/1972 | Nakao et al. | 426/266 |
| 3,690,901 | 9/1972 | Hinkley | 426/266 |
| 3,780,192 | 12/1973 | Danner et al. | 426/266 |

*Primary Examiner*—Robert A. Yoncoskie
*Attorney, Agent, or Firm*—Wolder, Gross & Yavner

[57] ABSTRACT

A process for producing cured meat products, which comprises treating a raw meat with a curing agent, and ascorbic acid and/or alkali metal salts thereof in the presence of ascorbinase. It is possible by this process to improve the color of cured meat products while greatly reducing the amount of the curing agent used.

9 Claims, No Drawings

PROCESS FOR PRODUCING CURED MEAT PRODUCTS

FIELD OF THE INVENTION

The present invention relates to a process for producing cured meat products, and more particularly to a process for producing cured meat products by treating a raw meat with a curing agent containing $NO_2$ and ascorbic acid, and/or alkali metal salts thereof.

DESCRIPTION OF THE PRIOR ART

It is well known that the conversion of meat pigments into a heat stable red or pink color, commonly referred to as curing, as well as acceleration of the curing rate are most important for the processing of various cured meat products such as, for example, hams, sausages, bacons and the like. To this end, it was classically known to use a curing agent containing $NO_2$ (for example, sodium nitrite which may be used alone or in combination with a nitrate such as sodium nitrate) and ascorbic acid, isoascorbic acid and/or alkali metal salts thereof.

For example, U.S. Pat. No. 2,739,899 (1956) teaches to add to the meat ascorbic acid, isoascorbic acid and/or alkali metal salts thereof either prior to, concomitantly with, or after the addition of usual curing agent. This results in a cured meat of superior flavor with a marked acceleration of the cure.

U.S. Pat. No. 3,386,836 (1968) describes that, although the mechanism of the reactions attendant the curing of meat has never been precisely ascertained, it is believed that, by curing, meat pigments, that is, myoglobin and hemoglobin are converted into pink or red color. The ascorbic acid and isomers thereof, as well as alkali metal salts thereof serve to accelerate the rate of curing time, when used either in combination with an ordinary curing agent containing nitrite, or with a gaseous nitric oxide.

U.S. Pat. No. 3,690,901 (1972) describes in its prior art statement that the reducing agent, for example, sodium ascorbate, sodium isoascorbate or their free acids serves several functions in the product. It either contributes to the reaction of the nitrite with myoglobin or favors the stability of the resulting complex. The combined use of the curing agent with such reducing agent may result in an undesirable time-consuming operation because nitrite is added at the initial stage of the processing to the meat and the reducing agent is added during the last minute in order to avoid interaction of the latter with the former and premature loss of nitrite oxide prior to the subsequent heat treatment.

In order to overcome these disadvantages, this U.S. patent teaches to apply initially and directly to the meat specified amounts of nitrite, dehydroascorbic acid, dehydroisoascorbic acid and/or alkali metal salts thereof under specified pH conditions (in Column 2, line 7 et seq.). It is believed that dehydroascorbic acid, dehydroisoascorbic acid and the like having no reducing activity are converted into active reducing agents by the action of the naturally occuring substances in the meat.

However, this process has various disadvantages from a practical viewpoint. The color-improving effects obtained by this process are not so high (see the comparative data shown in the following examples of the present application). It is difficult to supply stable dehydroascorbic acid, dehydroisoascorbic acid and the like without care. In this regard, refer to "Chori Kagaku Jiten" ("Dictionary of Cooking Science" in Japanese version, published in Tokyo), page 9 (1975) which describes that dehydroascorbic acid which has a poor physiological activity (½ to ⅓ of the activity of ascorbic acid) is unstable so that it decomposes quickly due to oxidation.

It has now been discovered that by the use of an ordinary curing agent together with ascorbic acid and/or alkali metal salts thereof in the presence of ascorbinase (E.C. 1.10.3.3), it is possible to improve the color-developing effect on cured meat products in a shorter period of time and also to reduce greatly the amount of the curing agent used.

SUMMARY OF THE INVENTION

According to the present invention, there is provided a process for producing cured meat products, by treating a raw meat with a curing agent containing $NO_2$, and ascorbic acid and/or alkali metal salts thereof, wherein the treatment is effected in the presence of ascorbinase.

Various advantages achieved by the process of the present invention are the following.

(1) It is possible to reduce greatly the amount of the curing agent containing $NO_2$ such as sodium nitrite, although the reactions occuring in the process of the present invention have not yet precisely been clarified.

(2) The process of the present invention may be carried out in conventional manner by the use of an ordinary curing agent, ascorbic acid and/or alkali metal salts thereof, with the exception that the process is carried out in the presence of ascorbinase. If desired, it is also possible to use various additives such as, for example, seasoning agents, spices, phosphates, sugar, proteins and the like in conventional manner.

(3) It is possible to enhance the color-developing effects in a shorter period of time. The color-developing effects obtained by the process of the present invention are, in all events, superior to those obtained by conventional processes such as the process disclosed in U.S. Pat. No. 3,690,901, by which the nitrite is added, in combination with dehydroascorbic acid, dehydroisoascorbic acid and the like, to the meat at the initial stage of the processing under specified pH conditions.

DESCRIPTION OF SPECIFIC EMBODIMENTS

For example, in the processing of various cured meat products such as, for example, hams, sausages, bacons and the like in conventional manner, the raw meat is treated with suitable amounts of curing agent containing $NO_2$, ascorbic acid and/or alkali metal salts thereof, table salt (about 1–5%) and various other additives such as, for example, sugar, spices, seasoning agents, phosphates, proteins and the like. Examples of the curing agents used conventionally include sodium nitrite and potassium nitrite which may be used alone or in combination with a nitrate such as sodium nitrate or potassium nitrate. It is also possible to use gaseous nitrogen oxide in place of the nitrite. In all events, the amount of the curing agent used is usually about 50–200 ppm calculated as $NO_2$ on the basis of 1 kg of the meat, and the amount of ascorbic acid and/or alkali metal salts thereof is usually about 100–600 ppm calculated as ascorbic acid on the basis of 1 kg of the meat.

According to the process of the present invention, it is possible to carry out the processing by using a suitable curing agent and ascorbic acid and/or alkali metal salts thereof in conventional manner with the exception of the presence of ascorbinase. Usually, the curing agent, ascorbic acid and the like and various other additives may be applied simultaneously to the meat in usual manner at the first stage of the processing. It is also possible to add to the meat ascorbic acid and/or alkali metal salts thereof after the addition of the curing agent. When sodium nitrate or potassium nitrate is used in combination with the nitrite, the amount of the nitrate is preferably from 100 to 1000 ppm as hereinbefore defined.

By virtue of the process of the present invention, good results may be obtained even by using a smaller amount (e.g. about 10–50 ppm as hereonbefore defined) of the ordinary curing agent.

Ascorbinase is a known enzyme which catalizes the oxidation of ascorbic acid with molecular oxygen. This enzyme is widely found in various edible plants such as, for example, cucumbers, pumpkins and the like and also may be produced by the action of microorganism. The amount of this enzyme used in the process of the present invention may vary, depending upon various conditions, within a wide range of from 50 to 1000 units, as hereinafter defined, and usually from 100 to 500 units, calculated on the basis of 1 kg of the meat.

For the process of the present invention, the pH range of the meat emulsion is not critical (for example, from 5 to 7).

The following non-limitative examples illustrate the invention, in which the amount of the curing agent is indicated by ppm calculated as $NO_2$ on the basis of 1 kg of the meat and the amount of ascorbic acid and/or alkali metal salts thereof is indicated by ppm calculated as ascorbic acid on the basis of 1 kg of the meat. The activity of the enzyme used is indicated by unit which was determined in reliance with the amount of the oxygen absorbed, using the following manometry.

A solution of sodium ascorbate ($1.2 \times 10^{-2}$ M; 2.5 ml) dissolved in a phosphate buffer solution (1/30 M; pH6.5), a diluted enzyme solution (0.5 ml) and a 10% caustic soda solution (0.2 ml) were respectively put into the main, side and auxiliary chambers of a Wargburg's manometer. After the reaction was effected for 20 minutes at a temperature of 37° C., the amount of the oxygen absorbed was calculated. From this value, the absorbed amount caused by autoxidation was deducted, and the enzymatic activity was indicated by the micromal value of the ascorbic acid which was oxidized per one ml of the enzyme solution for one minute.

The enzyme solution used in the examples was prepared in the following manner. Cucumbers, from which the seeds were removed (1380 g), were ground in association with a phosphate buffer solution (1/25 M; pH 7.0; 1380 ml) and were centrifuged to obtain a supernatant (2410 ml). Ammonium sulphate was added to saturation. The fractions precipitating between 30–45% saturation were collected and dissolved in water. The solution was subjected to the dialysis using water for 24 hours and was centrifuged to obtain an enzyme solution (241 ml) having an activity of 82 unit/ml.

EXAMPLE 1

A lean pork meat, from which fats were removed, was cut into cubes (each 2×2 cm). The meat (400 g) was well mixed with table salt (3%) and sodium pyrophosphate (0.3%) and was ground. Sodium nitrite (25 ppm), sodium ascorbate (200 ppm) and ascorbinase solution (80 units) was added to the ground meat which was then well mixed.

The meat emulsion was put into a casing (diameter 4 cm) made of vinylidene chloride, heated at a temperature of 70° C. for 30 minutes, and cooled with ice water to obtain a sample of sausage, designated as Sample No. 3. This sample was sliced and its color was determined in reliance with the value "a" indicating red color, by the use of a color-difference meter (Type ND-K5, a commercial product of Nippon Denshoku K.K., Japan). Acetone (0.3 ml) was separately added to another sliced sample (10 g; Sample No. 3). This sample was homogenized, followed by filtration to obtain an extracted solution, of which absorbance was measured at 545 m$\mu$ by using a spetrophotometer (Model 101, a commercial product of Hitachi Ltd., Japan) to determine the amount of the pigments formed in the sample.

For comparison, a sodium dehydroascorbate solution was prepared by the reaction of the enzyme solution (5 ml) and sodium ascorbate (80 mg) at a temperature of 30° C. for one hour. A similar treatment to that described above was repeated to prepare the following samples, with the exception that sodium nitrite (25 ppm) and the sodium dehydroascorbate solution thus-prepared (200 ppm, calculated as ascorbic acid) were individually used.

| Sample No. | Added with |
|---|---|
| 1 | Sodium nitrite |
| 2 | Sodium nitrite and sodium ascorbate |
| 4 | Sodium nitrite and sodium dehydroascorbate |

The results obtained from these samples are shown in the following Table 1.

TABLE 1

| Sample No. | A | B | C |
|---|---|---|---|
| 1 | 6.1 | 4.9 | 0.072 |
| 2 | 9.1 | 6.6 | 0.165 |
| 3 | 11.6 | 8.8 | 0.208 |
| 4 | 7.2 | 5.5 | 0.094 |

A - Value "a" immediately after slicing
B - Value "a" after 2 hours from slicing
C - Absorbance at 545 m$\mu$ As is apparent from this table, the color-improving effects of Sample No. 2 are better than the effects of Sample No. 1, and Sample No. 3 exhibits the best effects. Also, Sample No. 3 showed the lowest discoloration after 2 hours from slicing, and the discoloration degree of Sample No. 4 was interposed between the corresponding degrees of Sample Nos. 1 and 2. By organoleptic evaluation, it was found that the color of Sample No. 3 was most attractive. Furthermore, the amounts of the sodium ascorbate remaining in Sample Nos. 2 (136 ppm) and 3 (127 ppm) were determined by the 2,4-dichlorophenol/indophenol method.

EXAMPLE 2

| I. | Table salts | 30 | g |
|---|---|---|---|
| | Sodium pyrophosphate | 3 | g |
| | Sodium nitrite | 37.5 | mg |
| | Sodium ascorbate | 300 | mg |
| | Ascorbinase solution | 200 | units |
| II. | Sugar | 30 | g |

| | | | |
|---|---|---|---|
| | White pepper | 2 | g |
| | Nutmeg | 1 | g |
| III. | Pork fat | 200 | g |

The above-mentioned materials I, II and III were subsequently added to a pork lean meat (1 kg) with well mixing, and the mixture was treated in conventional manner with a Stephen cutter (Model UMTA 150, a commercial product of A Stepahn & Söhne GmbH & Co., Germany) to obtain a meat emulsion. The emulsion thus-prepared was immediately packed in a casing and heated at a temperature of 75° C. for 60 minutes to obtain a sample of sausage (Sample No. 3A). A similar treatment was carried out to obtain another sample (Sample No. 3B) with the exception that prior to the preparation of the emulsion, the pork lean meat added with Material I was left at a temperature of 5° C. for 24 hours. Similar treatments to those described above were repeated to obtain corresponding samples (Sample Nos. 2A and 2B) with the exception that both of which samples were not added with ascorbic acid. Thus, Sample Nos. 1A, 2A and 3A were prepared by using emulsions without previous curing. Further, similar teratments were repeated to obtain Sample Nos. 1'A, 1'B, 2'A, 2'B, 3'A and 3'B as indicated in the following Table 2. Sample Nos. 1B, 2B and 3B were prepared by using emulsions which had previously been cured for 24 hours, and Sample Nos. 1'A, 1'B, 2'A, 2'B, 3'A and 3'B corresponding to Sample Nos. 1A, 1B, 2A, 2B, 3A and 3B were prepared with the exception that the amount of the nitrite used was 100 ppm.

TABLE 2

| Sample No. | Nitrite (mg/kg) | Sodium ascorbate (mg/kg) | Ascorbinase (unit/kg) |
|---|---|---|---|
| 1A, 1B | 25 | 0 | 0 |
| 2A, 2B | 25 | 300 | 0 |
| 3A, 3B | 25 | 300 | 200 |

All samples were sliced and immediately after this, the "a" value, abosorbance at 545 mμ and remaining nitrite of each sample were determined in a similar manner to that described in Example 1. The results are indicated in the following Table 3.

TABLE 3

| Sample No. | I | II | III | Sample No. | I | II | III |
|---|---|---|---|---|---|---|---|
| 1A | 5.2 | 0.041 | 12.2 | 1'A | 10.5 | 0.116 | 51.6 |
| 2A | 9.6 | 0.116 | 11.6 | 2'A | 10.5 | 0.140 | 50.5 |
| 3A* | 10.3 | 0.141 | 10.5 | 3'A* | 10.8 | 0.146 | 44.2 |
| 1B | 9.1 | 0.127 | 9.9 | 1'B | 11.2 | 0.145 | 42.1 |
| 2B | 9.4 | 0.152 | 8.4 | 2'B | 10.6 | 0.157 | 40.0 |
| 3B* | 11.3 | 0.175 | 9.5 | 3'B* | 11.5 | 0.165 | 37.9 |

*Products of the process of the present invention
I - "a" value
II - Absorbance at 545 mμ
III - Remaining nitrite (mg/kg)

From these results, it is apparent that it is possible by the process of the present invention to obtain sufficient color-developing effects even by the use of a smaller amount of nitrite and also to shorten the curing rate.

What is claimed is:

1. A process for producing cured meat products, which process comprises treating a raw meat with a curing agent containing $NO_2$, and at least one member selected from ascorbic acid and alkali metal salts thereof in the presence of ascorbinase.

2. The process of claim 1, in which the curing agent is selected from the group consisting of sodium nitrite, nitrogen monoxide and mixture thereof.

3. The process of claim 1, in which the curing agent is sodium nitrate.

4. The process of claim 1, in which the amount of the curing agent is from about 10 to 200 ppm calculated as $NO_2$ on the basis of 1 kg of the meat.

5. The process of claim 4, in which the amount of the curing agent is from about 10 to 50 ppm on the basis of 1 kg of the meat.

6. The process of claim 1, in which the amount of said one member selected from ascorbic acid and alkali metal salts thereof is from about 100 to 600 ppm calculated as ascorbic acid on the basis of 1 kg of the meat.

7. The process of claim 1, in which the amount of ascorbinase is from about 100 to 1000 units calculated on the basis of 1 kg of the meat.

8. The process of claim 1 which further comprises preparing a meat emulsion of said raw meat which is then subjected to curing.

9. The process of claim 8, in which the meat emulsion has a pH of 5–7.

* * * * *